(12) United States Patent
Turner et al.

(10) Patent No.: US 9,802,580 B2
(45) Date of Patent: Oct. 31, 2017

(54) VEHICLE TREATMENT APPARATUS THAT EMITS AIR AND WATER

(71) Applicant: WashMe Properties, LLC, Northville, MI (US)

(72) Inventors: Barry S. Turner, Novi, MI (US); Michael J. Belanger, Northville, MI (US); David L. Tognetti, Howell, MI (US); Mark D. Morin, Plymouth, MI (US)

(73) Assignee: WashMe Properties, LLC, Northville, MI (US)

( * ) Notice: Subject to any disclaimer, the term of this patent is extended or adjusted under 35 U.S.C. 154(b) by 201 days.

(21) Appl. No.: 14/673,157

(22) Filed: Mar. 30, 2015

(65) Prior Publication Data

US 2015/0274134 A1    Oct. 1, 2015

Related U.S. Application Data (60) Provisional application No. 61/972,604, filed on Mar. 31, 2014.

(51) Int. Cl.
| | |
|---|---|
| *B60S 3/04* | (2006.01) |
| *B60S 3/00* | (2006.01) |
| *B08B 3/02* | (2006.01) |
| *B05B 7/00* | (2006.01) |

(52) U.S. Cl.
CPC ........ *B60S 3/04* (2013.01); *B05B 7/00* (2013.01); *B08B 3/022* (2013.01); *B60S 3/002* (2013.01)

(58) Field of Classification Search
None
See application file for complete search history.

(56) References Cited

U.S. PATENT DOCUMENTS

| | | | |
|---|---|---|---|
| 2,788,009 A | 4/1957 | Lones | |
| 4,949,423 A | 8/1990 | Larson et al. | |
| 4,979,316 A * | 12/1990 | Belanger | B60S 3/002 15/316.1 |
| 5,020,556 A | 6/1991 | Lamminen et al. | |
| 8,528,232 B1 * | 9/2013 | Ennis | B60S 3/002 134/12 |
| 2004/0084069 A1 | 5/2004 | Woodard | |
| 2006/0060217 A1 | 3/2006 | Wilsey | |
| 2008/0083428 A1 | 4/2008 | Johnston et al. | |

OTHER PUBLICATIONS

International Search Report, dated Jun. 16, 2015, 5 pages.

\* cited by examiner

*Primary Examiner* — Michael Barr
*Assistant Examiner* — Jason Riggleman
(74) *Attorney, Agent, or Firm* — John S. Artz; Dickinson Wright PLLC (57) ABSTRACT

A vehicle wash component for a vehicle wash system, including a frame portion and an air delivery portion disposed on the air delivery portion. The air delivery portion is configured to emit high velocity air onto a vehicle exterior. A fluid delivery portion is disposed on the frame portion. The fluid delivery portion is configured to emit high pressure fluid onto the vehicle exterior. The fluid delivery portion is disposed rearward from the air delivery portion with respect to a direction of travel of a vehicle. The air delivery portion and the fluid delivery portion are configured to emit the high velocity air and the high pressure fluid onto the vehicle exterior simultaneously.

35 Claims, 6 Drawing Sheets

VEHICLE TREATMENT APPARATUS THAT EMITS AIR AND WATER

TECHNICAL FIELD

The present application claims priority to U.S. Provisional Application Ser. No. 61/972,604, filed Mar. 31, 2014 and entitled "A Vehicle Treatment Apparatus that Emits Air and Water", which is hereby incorporated as though set forth fully herein.

TECHNICAL FIELD

The present disclosure relates generally to a vehicle treatment apparatus for use in a vehicle wash process. More specifically, the present disclosure relates to a vehicle treatment apparatus for use in a vehicle wash process that treats a vehicle exterior with a combination of air and water.

BACKGROUND OF THE INVENTION

Soap is widely used in vehicle wash processes to remove dirt from vehicle exteriors, including by applying it directly to the vehicle surface. Soap is often applied to the vehicle exterior as a foam such that it can be more effectively used by rotary brushes and other vehicle wash components to clean the vehicle exterior. Additionally, the use of foam as part of the vehicle wash process provides a perception to consumers that their vehicle exterior is being sufficiently cleaned.

More recently, vehicle wash components have been developed for emitting soap in the form of bubbles to a vehicle exterior instead of foam. Bubbles are generally larger in shape and substance than foam. Despite the fact that bubbles are larger than foam, they generally use less chemical, which can yield a significant cost savings to a wash operator. Because of their larger size as well as their shape and configuration, bubbles also generally provide consumers with a perception that they will provide a clean vehicle exterior.

While foam and bubbles are highly desirable because of the benefits they provide to both consumers and vehicle wash operators, they have drawbacks. Specifically, bubbles and foam can be more difficult to remove from a vehicle exterior before the drying process. If they are not completely removed, soapy streaks, spotting and/or residue on the vehicle exterior can remain, which is highly undesirable as it can make the vehicle exterior appear as if it had not been sufficiently cleaned.

One known solution to remove bubbles and foam from a vehicle exterior involves spraying a large volume of water onto the vehicle exterior at a high velocity. This yields higher costs due to the increased usage of water as well as increased energy consumption. While this can serve to remove the foam and bubbles, the usage of more water also generally requires the vehicle wash system to dedicate additional space in the conveyor line to allow the excess water to drip from the vehicle before the drying portion can work efficiently. This area is generally referred to as the "drip space zone" and, as is known, most facilities seek to minimize the length of the drip space zone as this is valuable space within a vehicle wash facility that is essentially wasted. Indeed, due to space constraints, some vehicle wash facilities do not have the capability to increase the length of the drip space zone in their facility without sacrificing another vehicle wash component, which can negatively affect the wash process. As such, the usage of foam and/or bubbles as part of the vehicle wash system may not be a viable option.

It would therefore be desirable to provide a vehicle wash component that allows foam and bubbles to be effectively removed from a vehicle exterior without necessitating an increase in the length of the drip space zone.

SUMMARY OF THE INVENTION

It is therefore an aspect of the present disclosure to provide a vehicle wash component that more effectively removes foam and bubbles from a vehicle exterior in a vehicle wash facility.

It is another aspect of the present disclosure to provide a vehicle wash component that allows a vehicle wash system to utilize less chemical to clean a vehicle exterior as compared to other systems.

It is a further aspect of the present disclosure to provide a vehicle wash component that decreases the cost of operation to a vehicle wash operator as compared to other systems.

It is still another aspect of the present disclosure to provide a vehicle wash component that allows for a decrease in the length of the drip space zone.

It is still a further aspect of the present disclosure to provide a vehicle wash component that allows a vehicle wash system to utilize additional vehicle wash components to increase the quality of the vehicle wash process without requiring additional conveyor length.

It is yet another aspect of the present disclosure to provide a vehicle wash component that allows a vehicle wash operator to decrease the amount of water required in the vehicle wash process.

It is yet a further aspect of the present disclosure to provide a vehicle wash component that allows for faster operation of a vehicle wash system to clean more vehicles in a shorter period of time, without compromising the quality of the washing/drying functions.

In accordance with the above and the other aspects of the present disclosure, a vehicle wash component is provided. The vehicle wash component includes a frame portion. A first side treatment portion is coupled to the frame portion. The first side treatment portion includes a first blower portion and a first fluid manifold portion. The first side treatment portion is configured to simultaneously emit air and fluid onto a first side vehicle exterior surface. A second side treatment portion is coupled to the frame portion on an opposite side of a vehicle treatment area from the first side treatment portion. The second side treatment portion includes a second blower portion and a second fluid manifold portion. The second side treatment portion is configured to simultaneously emit air and fluid on a second side vehicle exterior surface. An upper treatment portion is also coupled to the frame above the vehicle treatment area. The upper treatment portion includes an upper blower portion and an upper fluid manifold portion. The upper treatment portion is configured to simultaneously emit air and fluid onto an upper surface of a vehicle exterior.

BRIEF DESCRIPTION OF THE DRAWINGS

These and other features and aspects of the present disclosure will become more readily appreciated when considered in connection with the following detailed description and appended drawings, wherein.

DETAILED DESCRIPTION OF THE DISCLOSURE

With reference to the FIGs, a vehicle wash component 10 for use in a vehicle wash system 5 is disclosed. According to an aspect, the system 5 may be configured as a tunnel car wash, where a vehicle is conveyed through the wash process by a conveyor or the like as is known in the art. Alternatively, the vehicle wash system 5 may be configured as a roll-over type where the vehicle remains stationary and the components travel with respect to the vehicle. Other suitable wash processes and systems may also be employed. According to an aspect, the vehicle wash system 5 may be housed within a vehicle wash facility 12 having an entrance end 14 where a vehicle enters and an exit end 16 where the vehicle leaves. According to a further aspect, the vehicle wash system 5 may also include a variety of vehicle wash components that engage and/or treat the exterior of the vehicle as it passes through the vehicle wash facility 12 to effectuate the vehicle wash process.

According to an aspect, the vehicle wash system 5 may include a variety of vehicle wash components located in one or more of the following: a wash zone, a rinse zone, a drip space zone and a drying zone. According to an aspect, the different vehicle wash components used in the vehicle wash system 5 can include a rinse arch, which sprays water onto the vehicle and a bubble device that generates bubbles and emits them directly onto the vehicle exterior. An exemplary bubble device that may be employed with the disclosed system is disclosed in Applicant's co-pending U.S. patent application Ser. No. 13/864,813, entitled "A Vehicle Wash Component for Emitting Bubbles", filed Apr. 17, 2013, the disclosure of which is hereby incorporated by reference. Alternatively, the system 5 can include a foam generation device for generating and emitting foam onto a vehicle exterior as is known.

The system 5 can also include one or more top brushes for contacting a top exterior surface of the vehicle, a plurality of side brushes for contacting side exterior surfaces, and a plurality of wrap brushes for contacting the front and rear surfaces of a vehicle. The system 5 may also include wheel scrubbers, for cleaning the vehicle wheels and a wheel polishing device for polishing the vehicle wheels. The system 5 can also include a drying section. It will be appreciated that more, less or different wash components may be employed. Additionally, multiples of the same components may be employed as desired. Further, the components may take on a variety of different configurations and perform different functions. Moreover, the order, placement and sequence of the components within the system 5 may also vary. According to an aspect, the components are designed to engage and/or treat a vehicle disposed within a vehicle treatment area 18 of the vehicle wash facility 12.

According to an aspect, the vehicle wash component 10 may be disposed at the end of the rinse zone of a vehicle wash system 5 and before the drying zone. It will be appreciated that that the vehicle wash component 10 may be located before the drip space zone and that its inclusion may decrease the length required for the drip space zone, which can provide significant benefits to a vehicle wash operator, including requiring less housing space and/or allowing for more vehicle wash components in the other zones to treat a vehicle exterior within the same amount of space.

As shown, the vehicle wash component 10 may include a frame portion 20 having a pair of opposing leg portions 22 and a horizontal cross bar portion 24. Each leg portion 22 may include a base portion 26 that engages a floor of a vehicle wash facility and an upper portion 28 that can connect to and support the horizontal cross bar portion 24. Each of the leg portions 22 may be disposed on an opposing side of the vehicle treatment area 18 such that the horizontal cross bar portion extends above the vehicle treatment area 18. It will be appreciated that the distance between the opposing leg portions 22 may vary. Additionally, the height of the horizontal cross bar portion 24 over the vehicle treatment area 18 may vary. It will also be appreciated that the frame portion 20 could have a variety of different configurations, including one supported from a ceiling or side walls.

Figure 1:
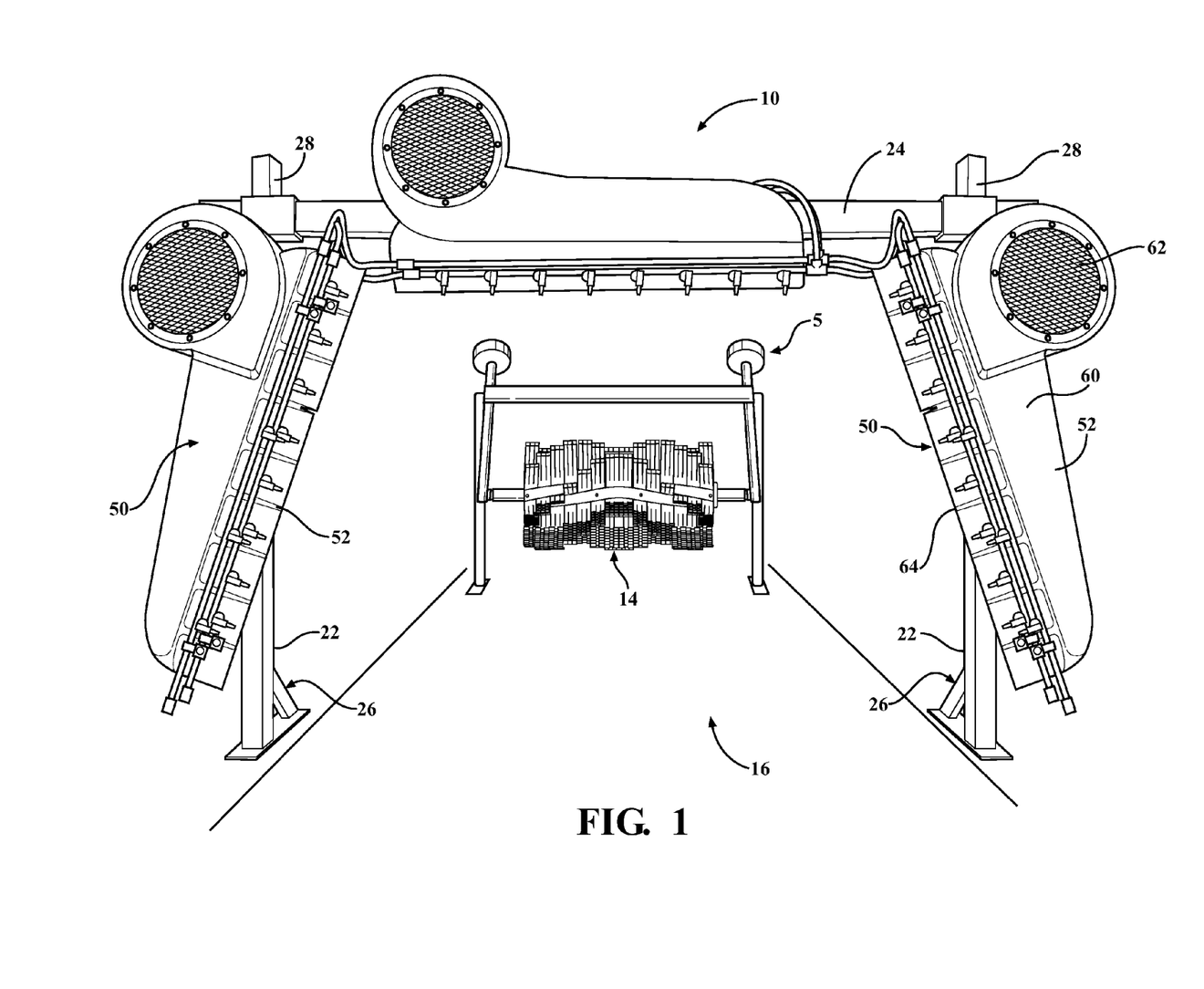
FIG. 1 is a rear view of a portion of a vehicle wash system in accordance with an aspect of the present disclosure.
Figure 2:
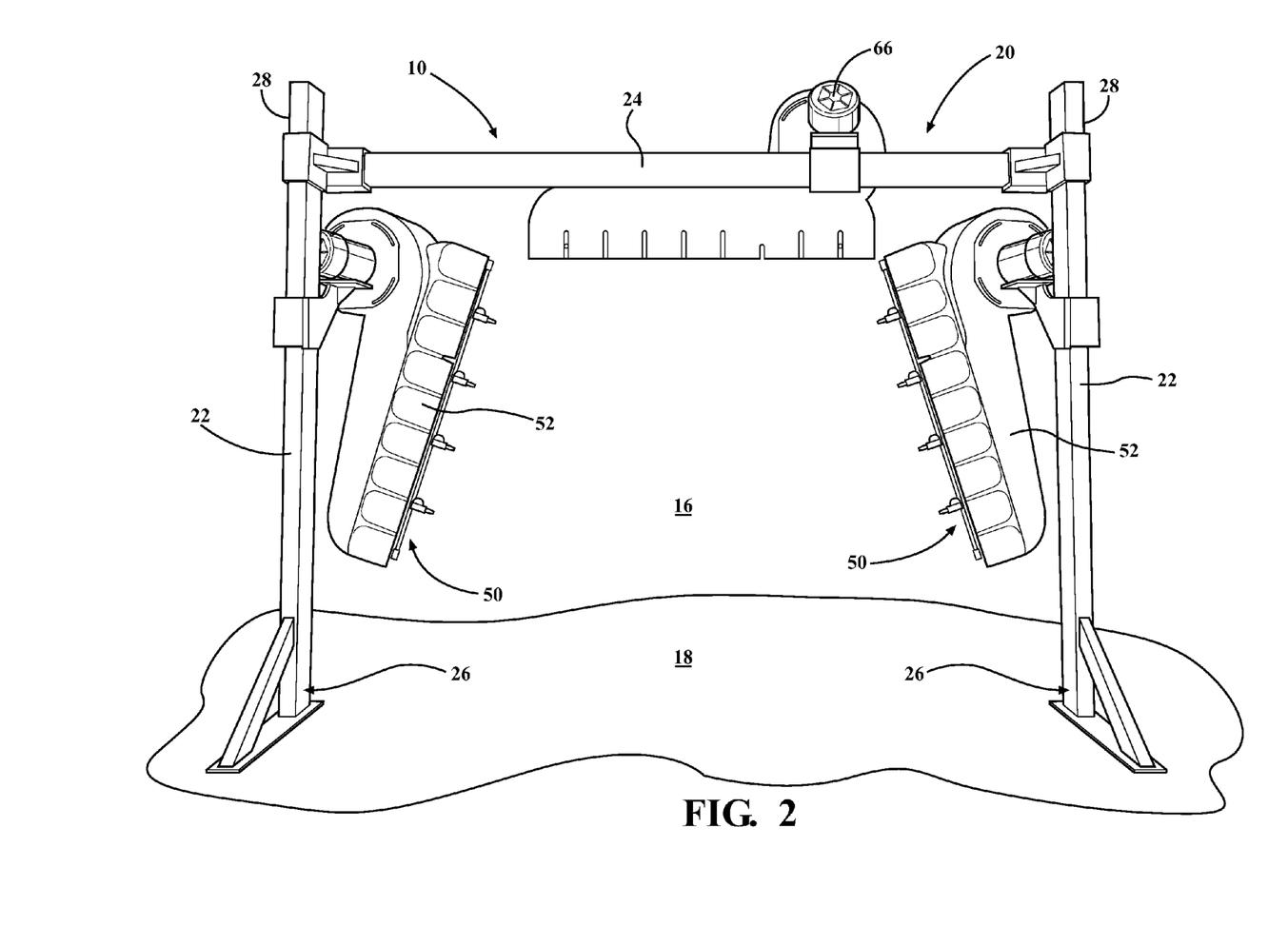
FIG. 2 is a front view of a vehicle wash component in accordance with an aspect of the disclosure.
Figure 3:
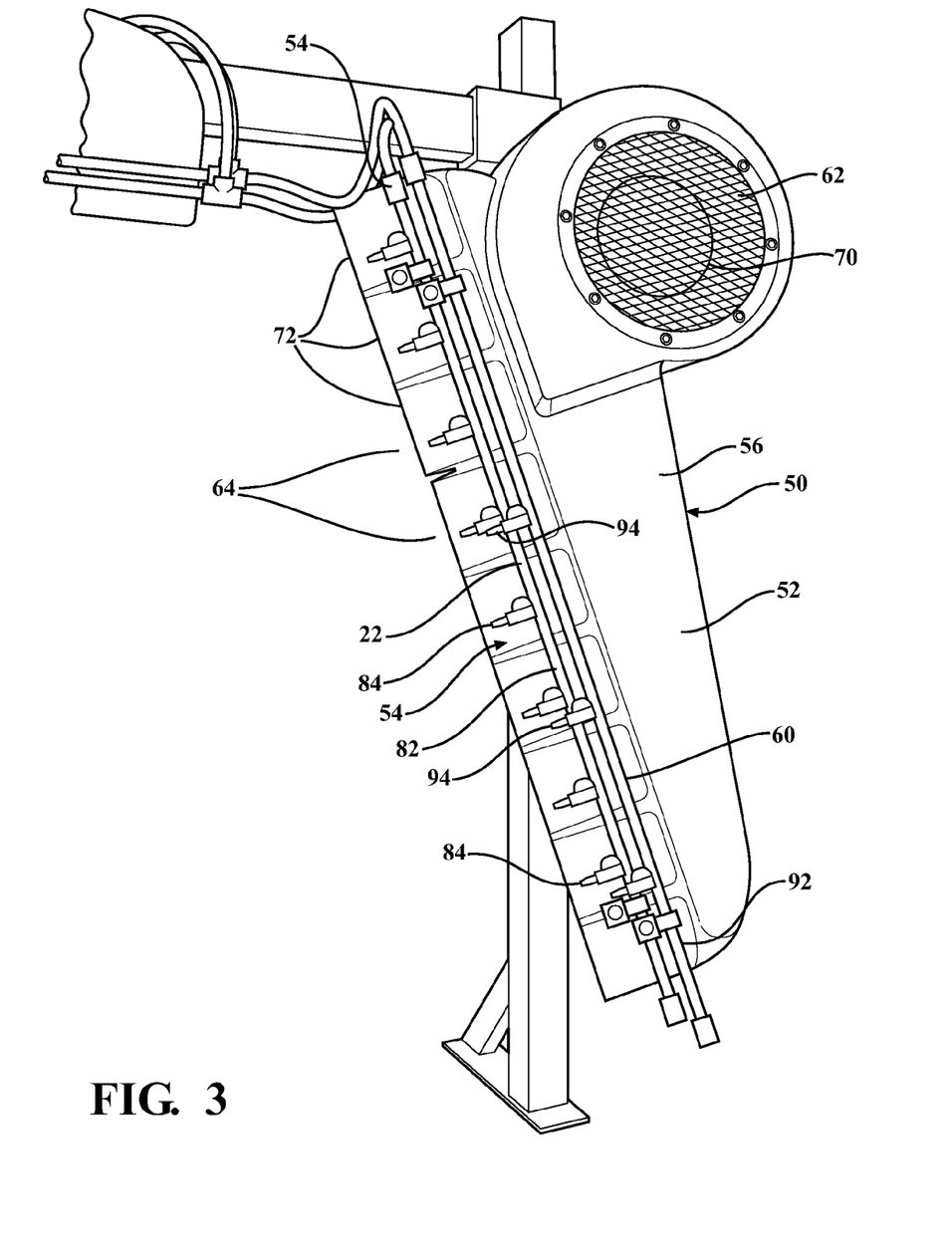
FIG. 3 is a schematic front perspective view of a first side portion of a vehicle wash component in accordance with an aspect of the present disclosure.
Figure 4:
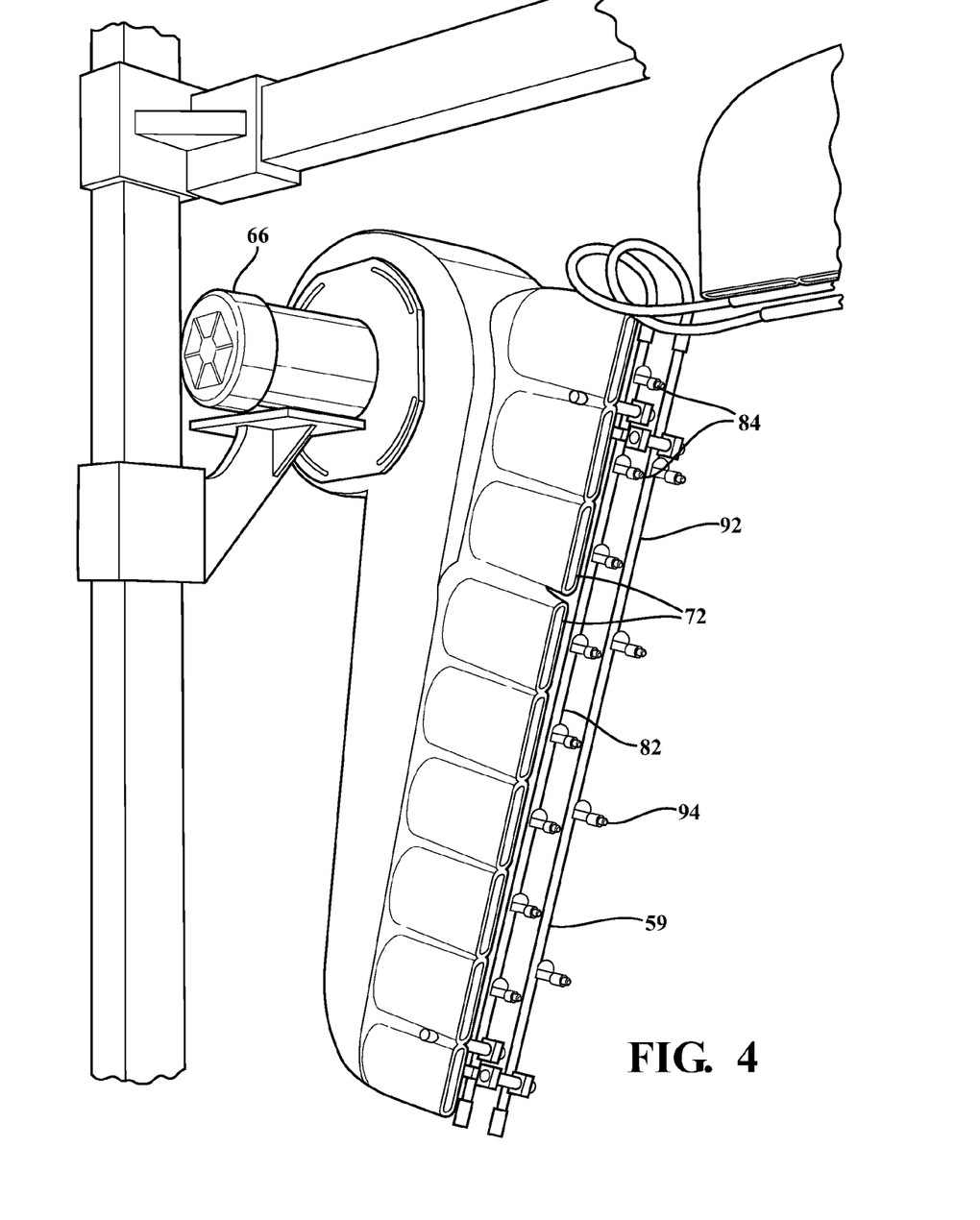
FIG. 4 is a schematic rear perspective view of a first side portion of a vehicle wash component in accordance with an aspect of the present disclosure.
Figure 5:
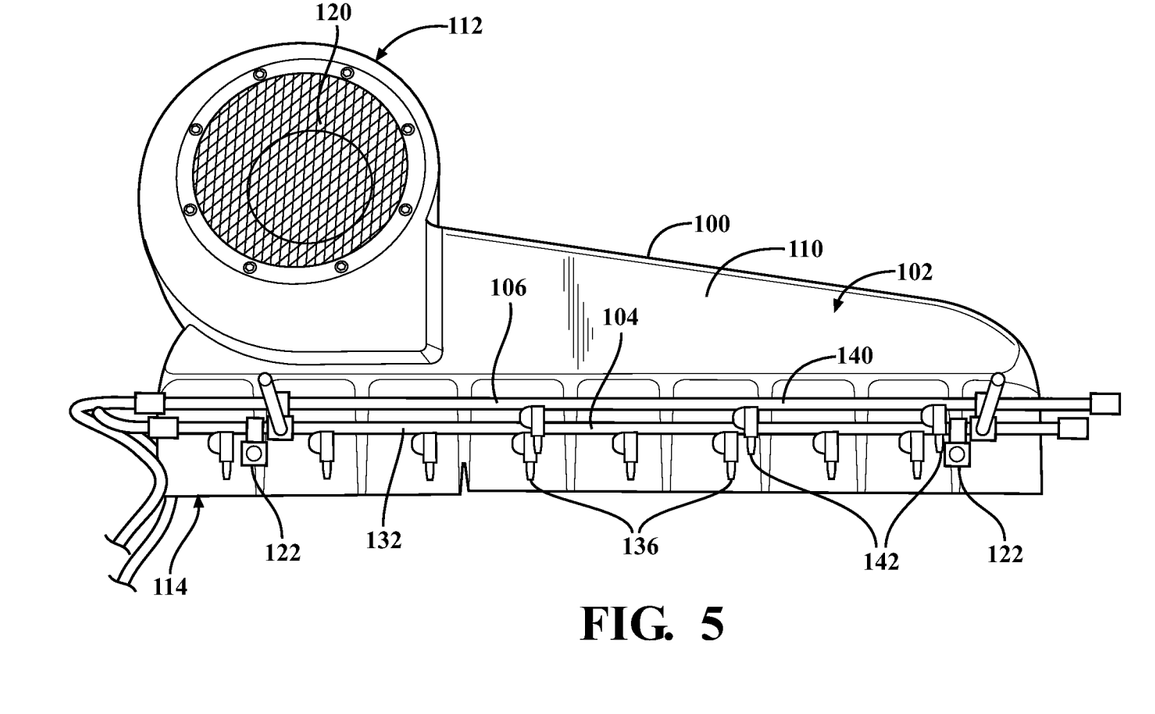
FIG. 5 is a rear view of an upper portion of a vehicle wash component in accordance with an aspect of the present disclosure.
Figure 6:
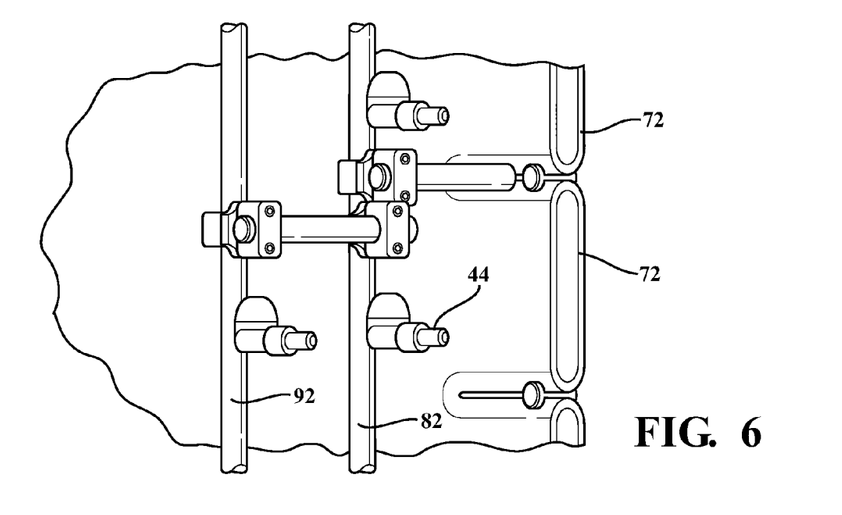
FIG. 6 is an enlarged view of a portion of a vehicle wash component in accordance with an aspect of the disclosure.
Figure 7:
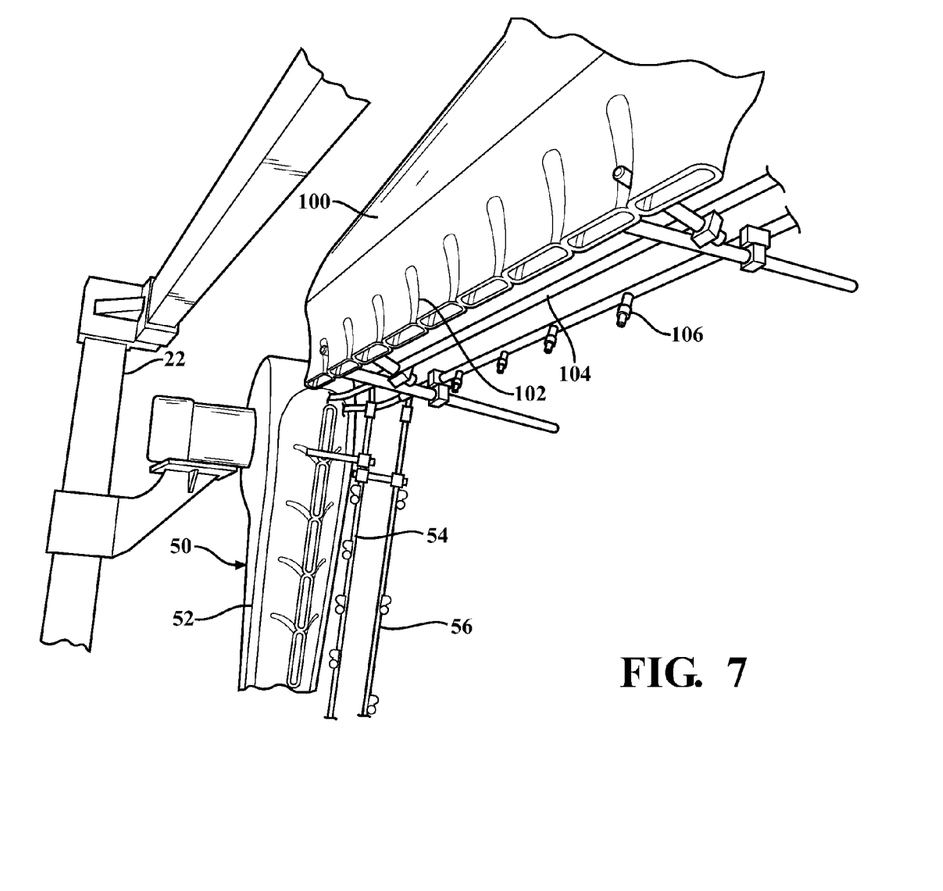
FIG. 7 is another perspective view of a side portion and an upper portion of a vehicle wash component in accordance with an aspect of the disclosure.

According to an aspect, a side treatment portion 50 may be disposed on each of the leg portions 22. In other words, according to an aspect, one side treatment portion may be located on either side of the vehicle treatment area 18. As shown in FIGS. 1-4 and 7, each side treatment portion 50 can include a blower portion 52, a first fluid manifold portion 54, and a second fluid manifold portion 56. According to another aspect, the blower portion 52 may have a body portion 60, an air inlet portion 62, and an outlet portion 64. The body portion 60 may be formed of a molded plastic material. However, other suitable materials may be utilized. The blower portion 60 may be formed by a variety of suitable molding or forming processes. According to an aspect, the air inlet portion 62 can include a motor 66 that can drive an impeller portion (not shown), to draw air into an air inlet opening 70. The motor 66 may be a 10 HP motor, however, any suitable motor may be employed. The outlet portion 64 may include a plurality of nozzle portions 72 through which air may be expelled onto a vehicle surface. As shown, nine nozzle portions 72 are employed in this exemplary device. However, any number of nozzle portions 72 may be utilized, which may have different sizes and configurations.

The side treatment portions 50 may be configured to draw air into the body portion 60 through the air inlet portion 62 and then expel it through the plurality of nozzle portions 72. The side treatment portion 50 may be configured to emit air from the plurality of nozzle portions 72 onto an exterior side surface of a vehicle. According to an aspect, the plurality of nozzle portions 72 may be oriented such that air can be directed onto the vehicle exterior at an angle with respect to a perpendicular axis extending outwardly from a side of a vehicle. According to another aspect, the plurality of nozzle portions 72 may be configured to direct air at a rearward angle, i.e., in a direction toward a rear of a vehicle. According to one aspect, the magnitude of the rearward angle may be between 5-10 degrees. However, it will be appreciated that the magnitude of the angle may vary. It will also be appreciated that the direction of the angle may also vary. As shown, the body portion 60 may also be angled in order to more accurately match a shape and contour of vehicle exterior. For example, the body portion 60 may be configured such that upper nozzle portions 72 are closer to the vehicle treatment area 18 than the lower nozzle portions 72.

According to an aspect, the first fluid portion 54 may be disposed rearwardly with respect to the blower portion 52 as defined by the direction of travel of the vehicle. The first fluid portion may include a manifold portion 82 and a plurality of fluid nozzles 84. The manifold portion 82 is in communication with a fluid supply. According to another aspect, the fluid supply may be water. However, a variety of other fluids may be employed. The first fluid portion 54 may be configured to emit fluid through the plurality of nozzle portions 84 onto an exterior side surface of a vehicle. According to an aspect, the plurality of nozzle portions 84 may be oriented such that fluid can be directed onto the vehicle exterior at an angle. According to another aspect, the plurality of nozzle portions 84 may be configured to direct air at a rearward angle, i.e., in a direction toward a rear of a vehicle or toward a vehicle exit. According to one aspect, the magnitude of the rearward angle may be between 5-10 degrees. It will also be appreciated that the direction of the angle may also vary. However, it will be appreciated that the magnitude of the angle may vary. As shown, the first fluid portion 54 may also be angled in order to more accurately match a vehicle exterior. For example, the first fluid portion 54 may be configured such that upper nozzle portions 84 are closer to the vehicle treatment area 18 than the lower nozzle portions 84.

According to a further aspect, the second fluid portion 56 may be disposed rearwardly with respect to the first fluid portion 54 as defined by the direction of travel of the vehicle. The second fluid portion 56 can include a manifold portion 92 and a plurality of fluid nozzles 94. The manifold portion 92 may also be in communication with a supply of fluid. According to another aspect, the fluid supply for the second fluid portion 56 may be a drying agent. However, a variety of other fluids may be employed. The second fluid portion 56 may be configured to emit fluid through the plurality of nozzle portions 94 onto an exterior side surface of a vehicle. According to an aspect the plurality of nozzle portions 94 may be oriented such that fluid can be directed onto the vehicle exterior at an angle. According to another aspect, the plurality of nozzle portions 94 may be configured to direct air at a rearward angle, i.e., in a direction toward a rear of a vehicle. According to one aspect, the magnitude of the rearward angle may be between 5-10 degrees. However, it will be appreciated that the magnitude of the angle may vary. It will also be appreciated that the direction of the angle may also vary. As shown, the second fluid portion 56 may also be angled in order to more accurately match a vehicle exterior. For example, the second fluid portion 56 may be configured such that upper nozzle portions 94 are closer to the vehicle treatment area 18 than the lower nozzle portions 94. It will be appreciated that more or less fluid portions may be incorporated into the side treatment portion.

According to another aspect, an upper treatment portion 100 may be disposed on the horizontal cross bar portion 24. As shown in the FIGs, the upper treatment portion 100 can include a blower portion 102, a first fluid manifold portion 104, and a second fluid manifold portion 106. According to another aspect, the blower portion 102 may have a body portion 110, an air inlet portion 112, and an outlet portion 114. The body portion 110 may be formed of a molded plastic material. However, other suitable materials may be utilized. The blower portion 110 may be formed by a variety of suitable molding or forming processes. According to an aspect, the air inlet portion 112 can include a motor 116 that can drive an impeller portion 118, to draw air into an air inlet 120. The motor 116 may be a 10 HP motor. However, any suitable motor may be employed. The outlet portion 114 may include a plurality of nozzle portions 122 through which air may be expelled onto a vehicle top surface. As shown, nine nozzle portions 122 are employed in this exemplary device. However, any number of nozzle portions 122 may be utilized, which may have different sizes and configurations.

The upper blower portion 102 may be configured to draw air into the body portion 110 through the air inlet portion 112 and then expel it through the plurality of nozzle portions 122. The upper treatment portion 100 may be configured to emit from the plurality of nozzle portions 122 air onto an exterior side surface of a vehicle. According to an aspect, the plurality of nozzle portions 122 may be oriented such that air can be directed onto the vehicle exterior at an angle. According to another aspect, the plurality of nozzle portions 122 may be configured to direct air at a rearward angle, i.e., in a direction toward a rear of a vehicle. According to one aspect, the magnitude of the rearward angle may be between 5-10 degrees. It will also be appreciated that the direction of the angle may also vary. However, it will be appreciated that the magnitude of the angle may vary. As shown, the body portion 110 may also be angled in order to more accurately match a vehicle exterior. For example, the body portion 110 may be configured such that upper nozzle portions 122 are closer to the vehicle treatment area 18 than the lower nozzle portions 122.

According to an aspect, the upper treatment portion 100 may also include a first fluid portion 104. The first fluid portion 104 may be disposed rearwardly with respect to the blower portion 102 as defined by the direction of travel of the vehicle. The first fluid portion 104 may include a manifold portion 132 and a plurality of fluid nozzles 134. The manifold portion 132 may be in communication with a fluid supply. According to another aspect, the fluid supply may be water. However, a variety of other fluids may be employed. The first fluid treatment portion 104 may be configured to emit fluid through the plurality of nozzle portions 134 onto an exterior side surface of a vehicle. According to an aspect the plurality of nozzle portions 134 may be oriented such that fluid can be directed onto the vehicle exterior at an angle. According to another aspect, the plurality of nozzle portions 134 may be configured to direct air at a rearward angle, i.e. in a direction toward a rear of a vehicle. According to one aspect, the magnitude of the rearward angle may be between 5-10 degrees. It will also be appreciated that the direction of the angle may also vary. However, it will be appreciated that the magnitude of the angle may vary. As shown, the first fluid portion 104 may also be angled in order to more accurately match a vehicle exterior. For example, the first fluid portion 104 may be configured such that upper nozzle portions 134 are closer to the vehicle treatment area 18 than the lower nozzle portions 134.

According to a further aspect, the side treatment portion 50 may also include a second fluid portion 106. The second fluid portion 106 may be disposed rearwardly with respect to the first fluid portion 104 as defined by the direction of travel of the vehicle. The second fluid portion 106 can include a manifold portion 142 and a plurality of fluid nozzles 144. The manifold portion 142 may also be in communication with a fluid supply. According to another aspect, the fluid supply for the second fluid supply portion 106 may be a drying agent. However, a variety of other fluids may be employed. The second fluid treatment portion 106 may be configured emit fluid through the plurality of nozzle portions 144 onto an exterior side surface of a vehicle. According to an aspect the plurality of nozzle portions 94 may be oriented such that fluid can be directed onto the vehicle exterior at an angle. According to another aspect, the plurality of nozzle portions 94 may be configured to direct air at a rearward angle, i.e., in a direction toward a rear of a vehicle. According to one aspect, the magnitude of the rearward angle may be between 5-10 degrees. However, it will be appreciated that the magnitude of the angle may vary. As shown, the second fluid portion 106 may also be angled in order to more accurately match a vehicle exterior. For example, the second fluid portion 106 may be configured such that upper nozzle portions 144 are closer to the vehicle treatment area 18 than the lower nozzle portions 144. It will be appreciated that more or less fluid portions may be incorporated into the side treatment portion.

According to an aspect, the system 5 may include a controller that is in communication with the vehicle wash component 12 as well as the other vehicle wash components used in the wash system 5. The controller may be configured to actuate the vehicle wash component 12 as the vehicle approaches the component and then turn it off after the vehicle passes.

In operation, a vehicle may have soap, bubbles and/or foam applied to its exterior during the vehicle wash process. According to an aspect, once the vehicle is cleaned, it can pass to the vehicle wash component 12. The controller can actuate the blower portions 52, 102 simultaneously with the first and second manifold portions 54, 56, 104, 106. The simultaneous application of air and water can serve to remove all the soap, bubbles and/or foam from the vehicle exterior quickly and efficiently as compared to prior systems and processes. The synergistic combination of air and water surprisingly and unexpectedly has worked better than simply using water or air alone as part of this final rinse. Additionally, it has also been determined that applying water to the vehicle exterior behind or after the application of air provides improved performance. Similarly, orienting the air and fluid at a small angle with respect to the vehicle exterior has also been determined to be also beneficial.

According to another aspect, application of a drying agent after the air and water more effectively sets the vehicle up for the drying zone. In other words, as is known, the drying agent serve to sheet the water off the vehicle surface. It has been determined that the combination of air and water leaves less water on the vehicle surface such that the drying agent can work more effectively, which decreases the time required to set the vehicle up for drying. As such, the length of the drip space zone can be reduced.

It will be appreciated that the vehicle wash component may include more or less portions that have different configurations.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The invention claimed is:

1. A vehicle wash component for a vehicle wash system, comprising:
    an air delivery portion including at least one air nozzle configured to emit high velocity air onto a vehicle exterior;
    a first liquid delivery portion including at least one first liquid nozzle configured to emit a first liquid onto the vehicle exterior;
    wherein the air delivery portion and the first liquid delivery portion are configured to connect to a control system to emit the high velocity air and the first liquid onto the vehicle exterior simultaneously; and
    wherein the at least one air nozzle and the at least one first liquid nozzle are oriented substantially parallel with one another to emit the high velocity air and the first liquid onto the vehicle at substantially the same angle as one another.

2. The vehicle wash component of claim 1, wherein the at least one air nozzle includes a plurality of air nozzles disposed generally in alignment with one another in a longitudinal direction; the at least one first liquid nozzle includes a plurality of first liquid nozzles disposed generally in alignment with one another in the longitudinal direction; a second liquid delivery portion includes a plurality of second liquid nozzles disposed generally in alignment with one another in the longitudinal direction adjacent to the first liquid delivery portion and the air delivery portion, and configured to emit a second liquid onto the vehicle exterior; the air delivery portion, the first liquid delivery portion and the second liquid delivery portion are spaced from one another in a lateral direction being transverse to the longitudinal direction; and wherein the air delivery portion, the first liquid delivery portion and the second liquid delivery portion are configured to connect to the control system to emit the high velocity air, the first liquid and the second liquid onto the vehicle exterior simultaneously.

3. The vehicle wash component of claim 2, wherein the first liquid delivery portion includes a fluid manifold configured to receive the first liquid from a first liquid supply through a fluid inlet and emit the first liquid through the first liquid outlet nozzles onto the vehicle exterior.

4. The vehicle wash component of claim 3, wherein the first liquid is water.

5. The vehicle wash component of claim 3, wherein the air delivery portion is a blower including a blower housing, an air inlet, the plurality of air outlet nozzles, and a motor driven impeller configured to draw air into the housing through the air inlet and emit air through the plurality of air outlet nozzles onto the vehicle exterior, and wherein the blower housing is constructed of an injection molded plastic.

6. The vehicle wash component of claim 2, wherein the air delivery portion and the first and second liquid delivery portions are disposed on a frame portion located adjacent a vehicle treatment area.

7. The vehicle wash component of claim 6, wherein the frame portion is disposed such that the air delivery portion and the first and second liquid delivery portions are configured to emit the first and second liquids and air onto a top exterior surface of the vehicle.

8. The vehicle wash component of claim 6, wherein the frame portion is disposed such that the air delivery portion and the first and second liquid delivery portions are configured to emit the first and second liquids and air onto a side exterior surface of the vehicle.

9. The vehicle wash component of claim 2, wherein the vehicle wash component is positioned in a vehicle wash facility having a vehicle treatment area extending between an entrance end and an exit end in a direction of travel of the vehicle; and
the air delivery portion and the first and second liquid delivery portions are configured such that the high velocity air and the first and second liquids are emitted onto the vehicle exterior at an angle with respect to an axis oriented perpendicular to the direction of travel of the vehicle.

10. The vehicle wash component of claim 9, wherein the air delivery portion and the first and second liquid delivery portions are disposed at a rearward directed angle relative to an axis extending in the direction of travel and toward the exit end of the vehicle wash facility.

11. The vehicle wash component of claim 10, wherein the rearward directed angle is between 5-10 degrees with respect to the axis extending in the direction of travel.

12. The vehicle wash component of claim 6, wherein the air delivery portion extends between an upper portion and a lower portion;
the air delivery portion is disposed at an angle relative to the frame such that the upper portion is located closer to the vehicle treatment area than the lower portion thereof; and
wherein the first and second liquid delivery portions each extend between an upper portion;
the first and second liquid delivery portions are each disposed at an angle relative to the frame such that the upper portion is located closer to the vehicle treatment area than the lower portion thereof.

13. The vehicle wash component of claim 2, wherein the second liquid is a chemical drying agent.

14. A vehicle wash system in a vehicle wash facility having a vehicle treatment area extending between an entrance end and an exit end in a direction of travel, said vehicle wash system comprising:
a vehicle wash component including:
a frame portion;
a blower portion disposed on the frame portion, the blower portion having a housing, an inlet opening formed in the housing for receiving air therethrough and a plurality of air outlet openings formed in the housing for emitting air onto a vehicle exterior;
a first manifold portion disposed on the frame portion, the first manifold portion having an inlet configured to receive a supply of a first liquid and at least one first liquid outlet opening configured to emit the first liquid onto the vehicle exterior;
a second manifold portion disposed on the frame portion adjacent to the first manifold portion, the second manifold portion having an inlet configured to receive a supply of a second liquid and at least one second liquid outlet opening configured to emit the second liquid onto the vehicle exterior;
wherein the blower portion, the first manifold portion and the second manifold portion are disposed on the frame portion in spaced relationship with one another in the direction of vehicle travel and are configured to be connected to a control system to emit air and the first and second liquids onto the vehicle exterior simultaneously.

15. The vehicle wash system of claim 14, wherein the blower portion further includes an impeller configured to rotate so as to draw air into the housing through the inlet opening and emit air through the plurality of air outlet openings; and
a motor in communication with the impeller to effectuate rotation thereof.

16. The vehicle wash system of claim 15, wherein the blower portion housing is construed of a plastic material.

17. The vehicle wash system of claim 16, wherein the blower portion housing is formed from an injection molding process.

18. The vehicle wash system of claim 14, wherein the first liquid is water, and the first manifold portion is configured to receive a supply of water that passes through the inlet.

19. The vehicle wash system of claim 18, wherein the first and second manifold portions are disposed rearward on the frame from the blower portion with respect to the direction of travel.

20. The vehicle wash system of claim 18, wherein the blower portion and the first manifold portion are configured to emit water and air onto a top exterior surface or a side exterior surface of the vehicle.

21. The vehicle wash system of claim 14, wherein the blower portion is disposed on the frame at a first angle relative to an axis extending in the direction of travel such that the high velocity air may be emitted onto the vehicle exterior at a first rearward angle relative to the axis extending in the direction of travel; and
   wherein the first and second manifold portions are disposed on the frame at a second angle relative to the axis extending in the direction of travel such that the first and second liquids may be emitted on the vehicle exterior at a second rearward angle relative to the axis extending in the direction of travel.

22. The vehicle wash system of claim 21, wherein the first rearward angle is 5-10 degrees with respect to the axis extending in the direction of travel;
   wherein the second rearward angle is the same as the first rearward angle.

23. The vehicle wash system of claim 14, wherein the blower portion extends between an upper portion and a lower portion and is disposed on the frame portion such that the upper portion thereof is located closer to the vehicle treatment area than the lower portion; and
   wherein the first manifold portion extends between an upper portion and a lower portion and is disposed on the frame portion such that the upper portion thereof is located closer to the vehicle treatment area than the lower portion.

24. The vehicle wash system of claim 14, wherein the second liquid is a chemical drying agent.

25. A vehicle wash system in a vehicle wash facility having a vehicle treatment area extending between an entrance end and an exit end in a direction of travel, said vehicle wash system comprising:
   a frame portion disposed adjacent a vehicle treatment area;
   a first side treatment portion coupled to the frame portion, the first side treatment portion including a first blower portion, a first side first manifold portion, and a first side second manifold portion;
   the first side blower portion including an air inlet, a plurality of first side air outlet nozzles, and an actuator configured to draw air into the first side blower portion through the air inlet and emit air out the plurality of first side air outlet nozzles;
   the first side first manifold portion including a fluid inlet and a plurality of first fluid outlet nozzles configured to emit a first fluid under pressure;
   the first side second manifold portion including a fluid inlet and a plurality of second fluid outlet nozzles configured to emit a second fluid under pressure;
   wherein the first side first manifold portion, the first side second manifold portion and the first side air outlet nozzles are spaced from one another in the direction of travel; and
   wherein the first side blower portion and the first side first manifold portion are configured to communicate with a controller in order to simultaneously emit air and fluid onto a side vehicle exterior surface.

26. The vehicle wash system of claim 25, further comprising:
   a second side treatment portion coupled to the frame portion, the second side treatment portion including a second side blower portion, a second side first manifold portion, and a second side second manifold portion;
   the second side blower portion including an air inlet, a plurality of second side air outlet nozzles, and an actuator configured to draw air into the second side blower portion through the air inlet and emit air out the plurality of second side air outlet nozzles;
   the second side first manifold portion including a fluid inlet and a plurality of first fluid outlet nozzles configured to emit the first fluid under pressure;
   the second side second manifold portion including a fluid inlet and a plurality of second fluid outlet nozzles configured to emit the second fluid under pressure;
   wherein the second side first manifold portion, the second side second manifold portion and the second side air outlet nozzles are spaced from one another in the direction of travel; and
   wherein the second side blower portion and the second side first manifold portion are configured to communicate with the controller in order to simultaneously emit air and fluid onto a side vehicle exterior surface.

27. The vehicle wash system of claim 26, further comprising:
   a top treatment portion coupled to the frame portion, the top treatment portion including a top blower portion, a top first manifold portion and a top second manifold portion;
   the top blower portion including an air inlet, a plurality of top air outlet nozzles, and an actuator configured to draw air into the top blower portion through the air inlet and emit air out the plurality of air outlet nozzles;
   the top first manifold portion including a fluid inlet and a plurality of first fluid outlet nozzles configured to emit the first fluid under pressure;
   the top second manifold portion including a fluid inlet and a plurality of second fluid outlet nozzles configured to emit the second fluid under pressure;
   wherein the top first manifold portion, the top second manifold portion and the top air outlet nozzles are spaced from one another in the direction of travel; and
   wherein the top blower portion and the top manifold portion are configured to communicate with the controller in order to simultaneously emit air and fluid onto a side vehicle exterior surface.

28. The vehicle wash system of claim 25, wherein the first side first blower portion further includes an impeller configured to rotate so as to draw air into the air inlet; and
   a motor in communication with the impeller to effectuate rotation thereof.

29. The vehicle wash system of claim 28, wherein the first side blower portion includes a housing construed of an injection molded plastic.

30. The vehicle wash system of claim 25, wherein the first side first manifold portion is configured to receive a supply of water that passes through the fluid inlet.

31. The vehicle wash system of claim 30, wherein the first side first manifold portion is spaced in the direction of travel from the first side blower portion.

32. The vehicle wash system of claim 25, wherein the first side blower portion is disposed on the frame at a first angle relative to an axis extending in the direction of travel such that the high velocity air may be emitted onto the vehicle exterior at a first rearward angle with respect to the axis extending in the direction of travel; and
   wherein the first side manifold portion is disposed on the frame at a second angle relative to the axis extending in the direction of travel such that the high pressure fluid may be emitted on the vehicle exterior at a second rearward angle with respect to the axis extending in the direction of travel.

33. The vehicle wash system of claim 32, wherein the first rearward angle is 5-10 degrees with respect to the axis extending in the direction of travel; and
    wherein the second rearward angle is the same as the first rearward angle.

34. The vehicle wash system of claim 25, wherein the first side blower portion extends between an upper portion and a lower portion and is disposed on the frame portion such that the upper portion thereof is located closer to the vehicle treatment area than the lower portion-thereof; and
    wherein the first side first manifold portion extends between an upper portion and a lower portion and is disposed on the frame portion such that the upper portion thereof is located closer to the vehicle treatment area than the lower portion thereof.

35. The vehicle wash system of claim 25, wherein the second is a chemical drying agent.

\* \* \* \* \*